United States Patent [19]

Chapman

[11] 4,306,194
[45] Dec. 15, 1981

[54] DATA SIGNAL DETECTION CIRCUIT

[75] Inventor: Dale B. Chapman, San Jose, Calif.

[73] Assignee: International Business Machines Corporation, Armonk, N.Y.

[21] Appl. No.: 84,028

[22] Filed: Oct. 11, 1979

[51] Int. Cl.³ .................. H03K 17/00; H03K 5/22
[52] U.S. Cl. .................. 328/150; 328/132; 307/236
[58] Field of Search ............ 307/351, 354, 362, 236, 307/530; 328/150, 114, 132

[56] References Cited

U.S. PATENT DOCUMENTS

| | | | |
|---|---|---|---|
| 3,437,833 | 4/1969 | Razaitis et al. | 328/114 X |
| 3,631,263 | 12/1971 | Graham et al. | 328/115 |
| 3,715,738 | 2/1973 | Kleist et al. | 328/114 |
| 4,064,408 | 12/1977 | Hon et al. | 307/351 |
| 4,163,909 | 8/1979 | Harr | 307/351 |
| 4,219,152 | 2/1979 | Couch et al. | 307/351 X |

Primary Examiner—James B. Mullins
Assistant Examiner—Gene Wan
Attorney, Agent, or Firm—Nathan N. Kallman

[57] ABSTRACT

A readout signal detection circuit comprises a data signal detector which senses changes in voltage of the signal waveform relative to signal peak amplitude; a threshold detector for sensing signal peak magnitudes that exceed a preset magnitude; a differentiator to locate signal peak position; and logic circuitry to test the validity of a linear readout signal applied to the detectors and the differentiator in parallel. A ramp timer provides a delay and fixed period during which the readout signal is checked for validity.

7 Claims, 17 Drawing Figures

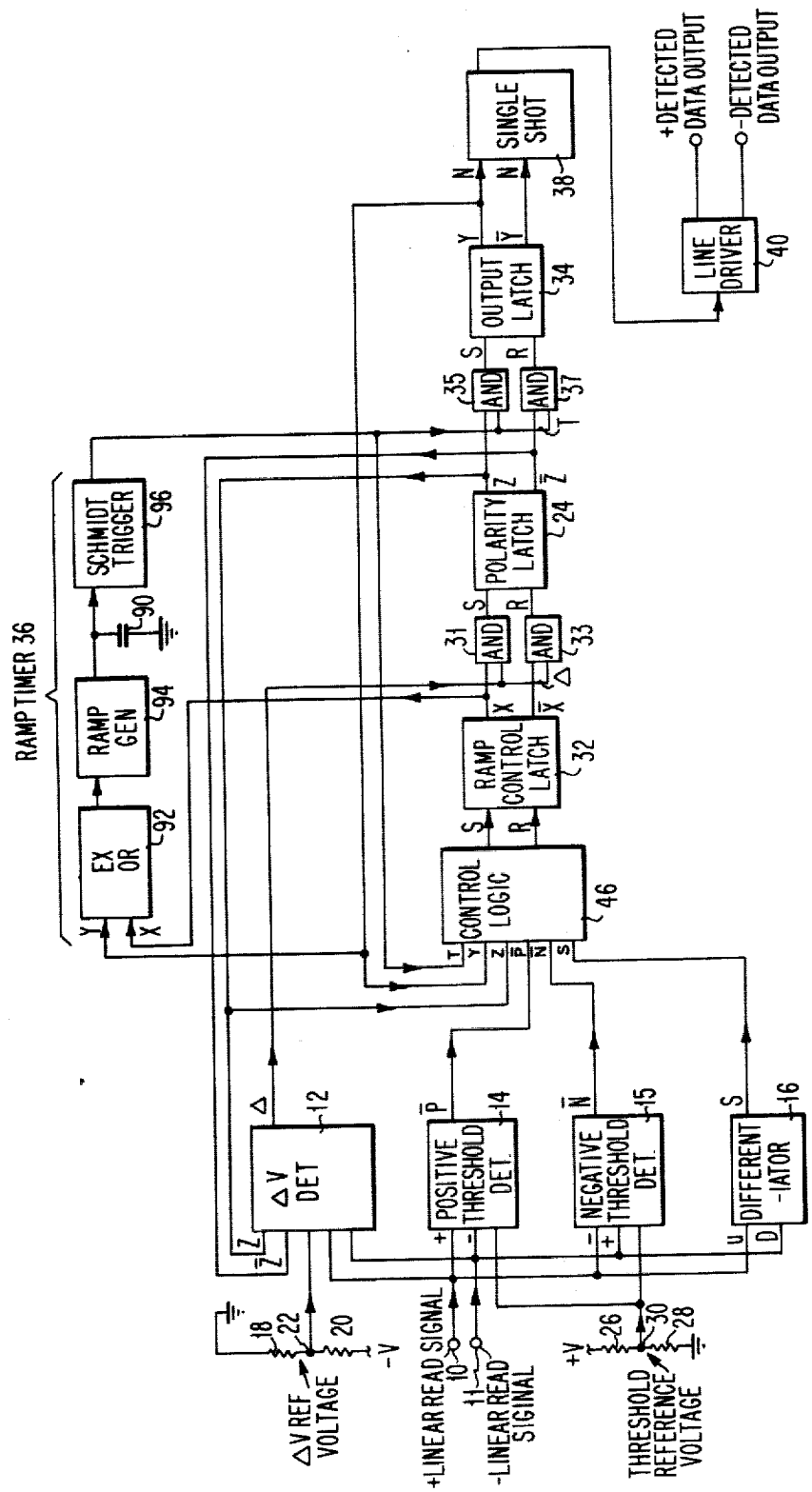

| POSSIBLE INPUT CONDITIONS | | | | | | OUTPUTS | |
|---|---|---|---|---|---|---|---|
| $\overline{N}$ | $\overline{P}$ | S | T | Y | Z | SET | RESET |
| 0 | 1 | 0 | 0 | 0 | 0 | 0 | 1 |
| 0 | 1 | 0 | 0 | 0 | 1 | 0 | 1 |
| 0 | 1 | 0 | 0 | 1 | 0 | 0 | 0 |
| 0 | 1 | 0 | 0 | 1 | 0 | 0 | 0 |
| 0 | 1 | 0 | 1 | 0 | 0 | 0 | 1 |
| 0 | 1 | 0 | 1 | 0 | 1 | 1 | 0 |
| 0 | 1 | 0 | 1 | 1 | 0 | 0 | 1 |
| 0 | 1 | 0 | 1 | 1 | 1 | 1 | 0 |
| 0 | 1 | 1 | 0 | 0 | 0 | 1 | 0 |
| 0 | 1 | 1 | 0 | 0 | 1 | 0 | 0 |
| 0 | 1 | 1 | 0 | 1 | 0 | 0 | 0 |
| 0 | 1 | 1 | 0 | 1 | 1 | 0 | 0 |
| 0 | 1 | 1 | 1 | 0 | 0 | 0 | 1 |
| 0 | 1 | 1 | 1 | 0 | 1 | 1 | 0 |
| 0 | 1 | 1 | 1 | 1 | 0 | 0 | 1 |
| 0 | 1 | 1 | 1 | 1 | 1 | 1 | 0 |
| 1 | 0 | 0 | 0 | 0 | 0 | 0 | 0 |
| 1 | 0 | 0 | 0 | 0 | 1 | 0 | 0 |
| 1 | 0 | 0 | 0 | 1 | 0 | 0 | 0 |
| 1 | 0 | 0 | 0 | 1 | 1 | 0 | 1 |
| 1 | 0 | 0 | 1 | 0 | 0 | 0 | 1 |
| 1 | 0 | 0 | 1 | 0 | 1 | 1 | 0 |
| 1 | 0 | 0 | 1 | 1 | 0 | 0 | 1 |
| 1 | 0 | 0 | 1 | 1 | 1 | 1 | 0 |

FIG.9A

| POSSIBLE INPUT CONDITIONS | | | | | | OUTPUTS | |
|---|---|---|---|---|---|---|---|
| $\overline{N}$ | $\overline{P}$ | S | T | Y | Z | SET | RESET |
| 1 | 0 | 1 | 0 | 0 | 0 | 0 | 0 |
| 1 | 0 | 1 | 0 | 0 | 1 | 0 | 0 |
| 1 | 0 | 1 | 0 | 1 | 0 | 0 | 0 |
| 1 | 0 | 1 | 0 | 1 | 1 | 1 | 0 |
| 1 | 0 | 1 | 1 | 0 | 0 | 0 | 1 |
| 1 | 0 | 1 | 1 | 0 | 1 | 1 | 0 |
| 1 | 0 | 1 | 1 | 1 | 0 | 0 | 1 |
| 1 | 0 | 1 | 1 | 1 | 1 | 1 | 0 |
| 1 | 1 | 0 | 0 | 0 | 0 | 0 | 0 |
| 1 | 1 | 0 | 0 | 0 | 1 | 0 | 0 |
| 1 | 1 | 0 | 0 | 1 | 0 | 0 | 0 |
| 1 | 1 | 0 | 0 | 1 | 1 | 0 | 0 |
| 1 | 1 | 0 | 1 | 0 | 0 | 0 | 1 |
| 1 | 1 | 0 | 1 | 0 | 1 | 1 | 0 |
| 1 | 1 | 0 | 1 | 1 | 0 | 0 | 1 |
| 1 | 1 | 0 | 1 | 1 | 1 | 1 | 0 |
| 1 | 1 | 1 | 0 | 0 | 0 | 0 | 0 |
| 1 | 1 | 1 | 0 | 0 | 1 | 0 | 0 |
| 1 | 1 | 1 | 0 | 1 | 0 | 0 | 0 |
| 1 | 1 | 1 | 0 | 1 | 1 | 0 | 0 |
| 1 | 1 | 1 | 1 | 0 | 0 | 0 | 1 |
| 1 | 1 | 1 | 1 | 0 | 1 | 1 | 0 |
| 1 | 1 | 1 | 1 | 1 | 0 | 0 | 1 |
| 1 | 1 | 1 | 1 | 1 | 1 | 1 | 0 |

FIG. 9B

DATA SIGNAL DETECTION CIRCUIT

DESCRIPTION

1. Technical Field

This invention relates to a novel and improved signal detection circuit, and in particular to a high density data readout system.

2. Objects

An object of this invention is to provide a reliable signal detection circuit, wherein transients and noise signals are eliminated from the readback output signal.

Another object of this invention is to provide an improved signal detection circuit for operation with high density data, wherein valid data signals are separated from overshoot and noise signals.

BACKGROUND ART

The continuing trend in the technology of data recording systems is to record data with higher densities and closely packed data bits or pulses so as to utilize the available storage surface of the record medium in an optimum manner. Apparently, as packing densities are incresed, there are attendant problems, such as pulse crowding, with resultant reduction in signal amplitude of adjacent bits, asymmetry of the data pulses, bit shift, and the like. Thus, during the readback process, low amplitude noise signals, sloping shoulder portions between data bits, and other spurious nondata voltages, may be detected and interpreted erroneously as data, or valid data may be distorted or lost.

BRIEF DESCRIPTION OF THE DRAWING

The invention will be described in greater detail with reference to the drawing in which:

FIG. 2 depicts a schematic and block circuit diagram of the readout detection circuit of this invention;

FIGS. 9A and B are truth tables of the logic utilized to control the ramp control latch of this invention.

DISCLOSURE OF THE INVENTION

Figure 1:
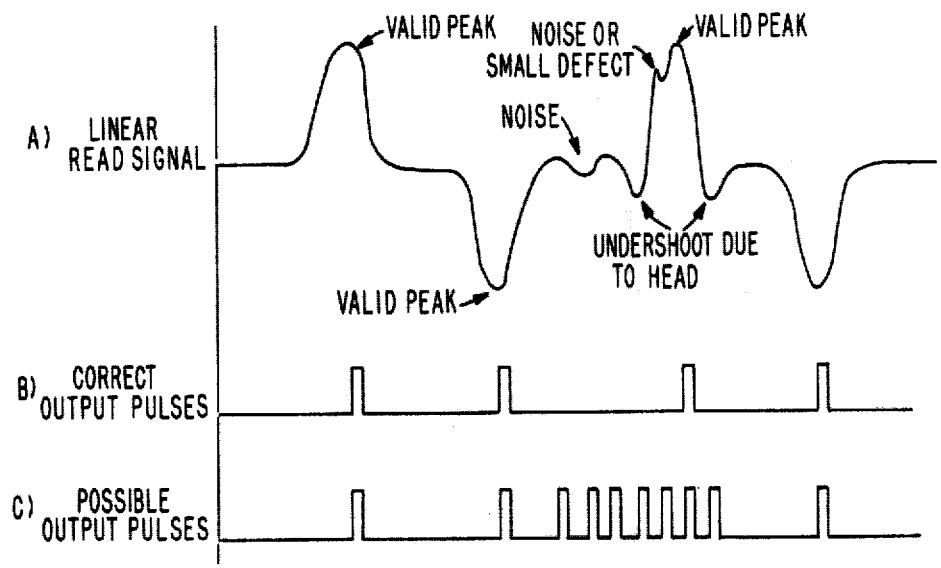
FIGS. 1A-C provide a representational illustration of data pulse waveforms, illustrating the problems which may occur with a readout signal.

With reference to FIG. 1, waveform A represents a linear readout signal having valid peaks with noise, undershoot and defect signals interposed. Waveform B of FIG. 1 shows the correct output pulses which would result from detection of the valid peaks. However, as indicated in FIG. 1C, output pulses which are not valid may possibly be detected from the noise, undershoot or defective signals that appear between the valid signal peaks. This problem is overcome with the readout signal detection circuit of the present invention.

The signal detection circuit of this invention passes as being valid only those data pulses which meet specified criteria that must occur in a prescribed sequence, as follows:

1. The detected signal pulse must have the proper polarity, and successive pulses must alternate in polarity.
2. The amplitude of the signal must exceed a predetermined threshold level.
3. A change in sign of the slope is detected, that is, when a peak occurs.
4. The voltage retreats from the maximum amplitude or the peak by a predetermined voltage, defined as the $\Delta V$ reference level, before a time delay is exceeded. The time delay is initiated by the detection of the change in slope.

If the sequence of these four events is completed, a valid output pulse is transmitted at the end of the time delay.

The reference voltages that determine respectively the threshold level and the $\Delta V$ level are set separately. Therefore, in some data apparatus, such as those which employ ferrite heads, the $\Delta V$ detection is more significant and the reference voltage is set accordingly. In contrast, data apparatus that use thin film heads operate better when the clip level reference voltage is dominant, and the threshold reference voltage level is set accordingly. When a combination of ferrite heads and thin film heads are used in the same apparatus, computer controlled logic may be used to switch detection between the two by setting digital-to-analog converter output voltages for the different reference levels.

In a similar manner, computer controlled logic may be used to set digital-to-analog converter output voltages to change the reference levels of either the threshold detector circuit or the $\Delta V$ detection circuit, or both, to vary the detection criteria in the event of a readback error. When readback errors occur in a direct access storage device, a number of actions may be taken. One possible action is to reread the data. The ability to vary the detection criteria by computer control can, with some forms of readback errors, enhance the ability of the detection circuit to process the signal correctly.

In an embodiment of the invention as illustrated in FIG. 2, a linear differential read signal (FIG. 3) is provided as an analog input, for example, from an automatic gain circuit (not shown) to input terminals 10 and 11. The input signals are simultaneously applied to a $\Delta V$ detector 12, positive and negative threshold detectors 14 and 15 respectively, and a differentiator 16.

The $\Delta V$ detector 12 detects and holds the peak amplitude (point 1, FIG. 3) of the linear read input signal and produces a logic signal $\Delta$ (FIG. 3) when the linear read signal has dropped from its peak voltage by a predetermined amount, as at point 2. This predetermined voltage drop, designated as $\Delta V$, is determined by an external voltage applied from a resistive network coupled to the input of the $\Delta V$ detector. The resistive network includes resistor 18 tied to ground or zero reference voltage, and resistor 20 which is connected to a negtive voltage source. The input circuit of the $\Delta V$ detector is coupled to a junction 22 dividing the resistors 18 and 20. The $\Delta V$ detector detects only one signal polarity at a time, the polarity being determined by the state of a polarity latch 24, which provides an output signal Z or $\overline{Z}$.

The threshold detectors 14 and 15 measure the differential voltage applied to the linear read signal inputs and compare the differential voltage against a threshold level. Threshold detection is accomplished with positive and negative threshold detectors 14 and 15, respectively. Each detector is implemented by a comparator with an input offset voltage. A down level output, labeled $\overline{P}$ (FIG. 3), is produced by the positive threshold detector 14 when the voltage of the positive linear read signal is more positive than the voltage of the negative linear read signal by a difference that is in excess of the input offset voltage. When the negative Linear read signal voltage is more positive than the sum of the positive linear read signal and the input offset voltage, a down level output $(\overline{N})$ is produced by the negative threshold detector 15. The input offset voltage of the detectors 14 and 15 is proportional to the threshold reference voltage. The reference voltage is determined by the voltages developed by resistors 26 and 28, and appears at junction 30 at the input circuits to the detectors 14 and 15.

Thus, when one polarity of the linear read signal is greater than the other polarity by a voltage that is greater than the threshold level (which is proportional to the threshold reference voltage), a down level is developed at the output of the appropriate detector. The output signal occurs at the output of the positive threshold detector 14 if the positive linear read signal is more positive. An output signal is produced from the negative threshold detector if the negative linear read signal is more positive than the positive linear read signal by a voltage in excess of the threshold voltage.

The differentiator 16 receives the differential read signal from input terminals 10 and 11 and detects the sign of the slope of the linear read signal. A logic signal S is generated which is indicative of the signal slope. If the positive read signal is rising, the output S will be at an up-level. If the read signal is in a steady state, i.e., a DC condition, the logic outputs of the differentiator are indeterminate. In effect, the differentiator 16 serves to detect when the peaks of the linear read signal occur.

Figure 6:
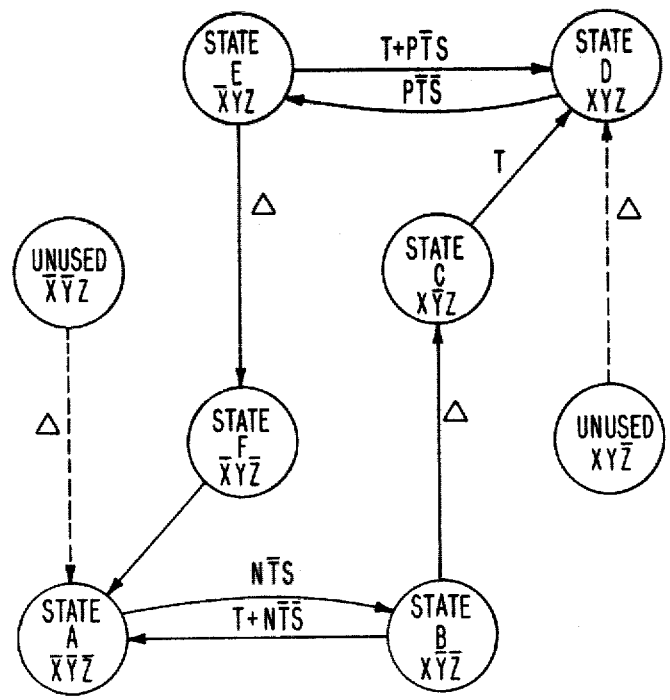
FIG. 6 is a logic state diagram applicable to the readout detection circuit of this invention.
Figure 3:
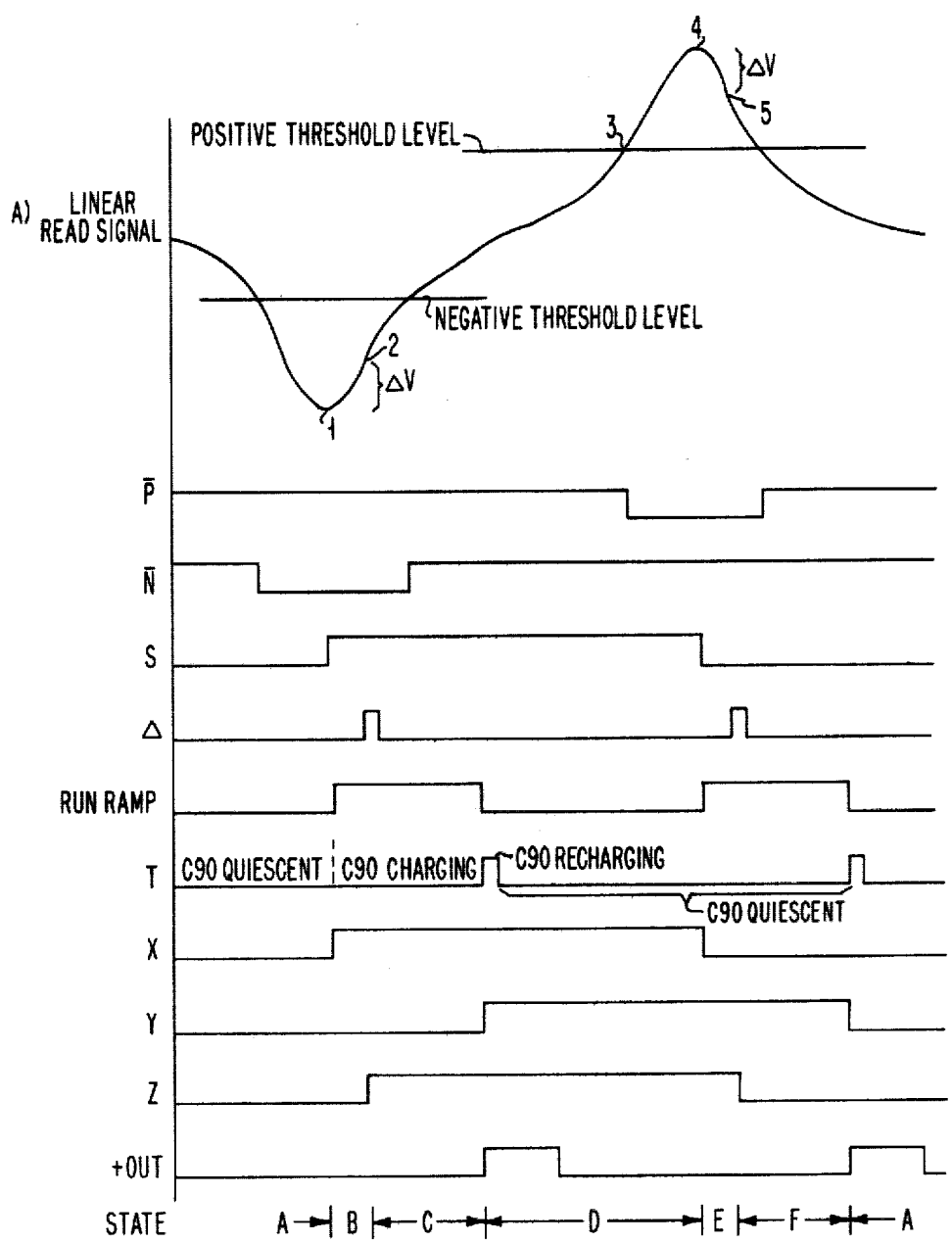
FIG. 3 is a series of waveforms applicable to processing an idealized linear read signal.

The logic of the detection circuit requires that a set of sequential events occur before a linear read signal peak is determined to be a valid signal peak. Real peaks are separaed from spurious peaks impressed on the signal by noise, interference from adjcent recorded data tracks and by interference caused by the leading and trailing edges of a recording head, for example. The sequence of the detection logic is illustrated in FIG. 6. The symbology used in FIG. 6 is as follows:

X = State of Ramp Control Latch 32
Y = State of Output Latch 34
Z = State of Polarity Latch 24
N = Negative Threshold Level Exceeded
P = Positive Threshold Level Exceeded
S = Sign of Slope of Linear Signal
Δ = A ΔV has been detected
T = Ramp Timer 36 has timed out With reference to the logic diagram of FIG. 6, and the timing diagram of FIG. 3, it is assumed that the logic is first in state A, with all latches 32, 24, 34 being in a reset state. This is a standby state in which the detector is ready to detect a negative peak. Since the peaks of the signals detected, from a recorded disk for example, alternate in polarity, the detection circuit imposes an alternating polarity requirement of the signals. The logic remains in state A until a negative peak 1 (FIG. 3) occurs on the linear read signal, which is at a voltage exceeding the negative threshold level.

As a result, the ramp control latch 32 will be set, and the logic status is now in state B, during which a ramp timer 36 will begin timing. The ramp timer provides a fixed time delay from the detection of a peak until an output pulse is transmitted. During this time delay the linear read signal is checked for a change in voltage, ΔV. The ramp timer comprises an exclusive OR gate 92, a ramp generator 94, a Schmidt trigger 96, and a capacitor 90. The ΔV circuit 12 will detect when the linear signal has a magnitude less than the peak by an amount equal to the ΔV voltage. At this point, the polarity latch 24 is set, and the logic is in state C. The change of state of the polarity latch causes the negative peak detector in the ΔV detector to be reset, thus causing the removal of the set input to the polarity latch. At this point, the ΔV detector is conditioned to detect positive peak changes in voltage. State C indicates that the peak signal has been determined to be a valid peak.

The logic now waits for the ramp timer 36 to complete its period before transmitting an output pulse. The delay between the peak of the signal and the output pulse, which is a fixed delay, does not vary because the phase of the peak carries the recorded data. When the ramp timer period has been completed, the output latch 34 is set, and the logic is in state D. The change in state of the output latch causes an output pulse Y to be transmitted through a single shot multivibrator 38 and line driver 40 for further utilization and separation. The single shot 38 is fired by a state change by the output latch 34. The state change also causes the ramp timer to be reset. The setting of the output latch indicates that the detection cycle for the negative peak has been completed.

In state D, all the latches 32, 24 and 34 are set, and the logic is in a standby state in which the circuit logic is conditioned to detect a positive peak. The cycle operates in the same manner as that described for the negative peak detection, except for polarity. If the signal exceeds the positive threshold level, such as illustrated at point 3 (FIG. 3), a change of sign of the slope, such as detected by the differentiator 16 at point 4 resets the ramp control latch 32. This action begins the running of the ramp timer 36, and the logic status is in state E. The occurrence of a change in voltage ΔV at point 5 causes the polarity latch 24 to be set, which is state F, and in turn the positive peak detector in the ΔV detector is reset. When the ramp timer 36 ends its period, the output latch is reset, which returns the logic to state A.

Figure 4:
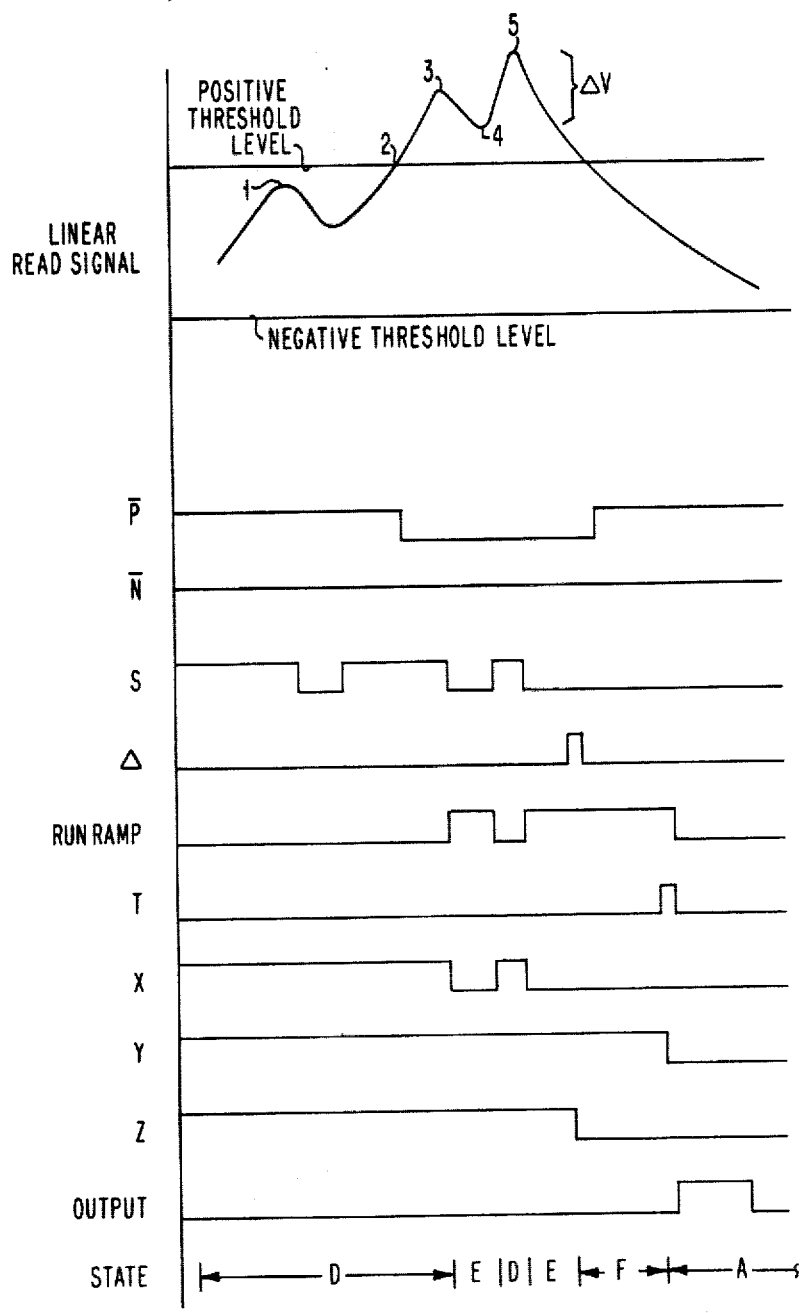
FIGS. 4 and 5 are series of waveforms applicable to processing linear read signals with noise.

FIG. 4 illustrates the signal responses in the case where the linear read signal includes noise. Initially, the logic state is assumed to be state D. The peak at point 1 in FIG. 4 is ignored because it is below the positive threshold level. The waveform rises above the positive threshold level at point 2. At point 3, a peak is detected and the logic goes to state E. At point 4, the waveform assumes a positive slope again before a ΔV has been detected. This slope change causes the logic to return to state D. The ramp timer 36 is reset and no output pulse occurs. The logic will remain in state D until another positive peak is detected at point 5.

Figure 5:
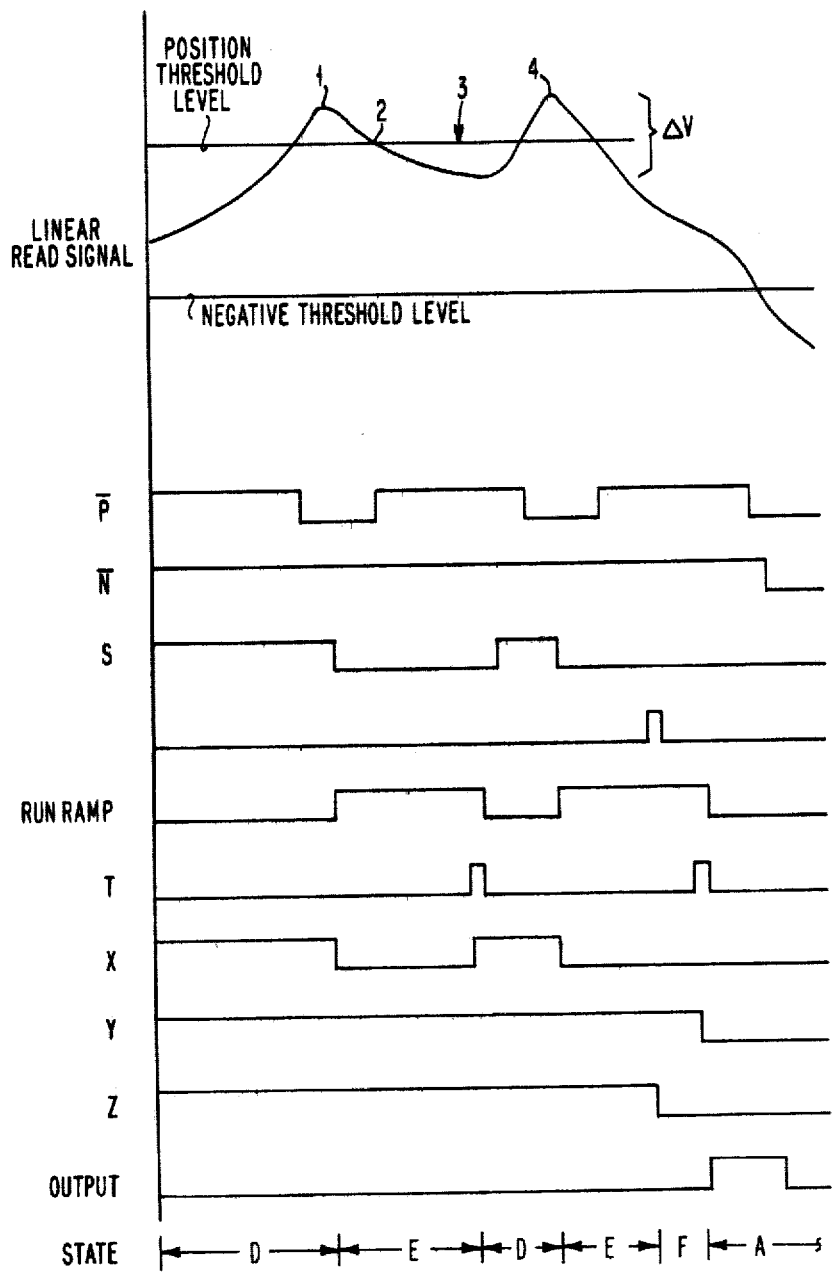

FIG. 5 illustrates another form of linear read signal with noise. In this case, a peak is detected above the threshold level at point 1. This causes the logic to go to state E. The ramp timer 36 begins its timing period. At point 2 the waveform falls below the threshold level. The logic remains in state E. At point 3, the ramp timer has timed out, without a ΔV voltage having been detected. This causes the logic to return to standby state D. The ramp timer is reset and no output pulse is produced. The detection circuit awaits another positive peak, such as at point 4 of FIG. 5.

The logic system includes two states which are not normally used. In the event the logic is in one of these states on power-up, the occurrence of a ΔV will translate the logic into state A or D.

Figure 7:
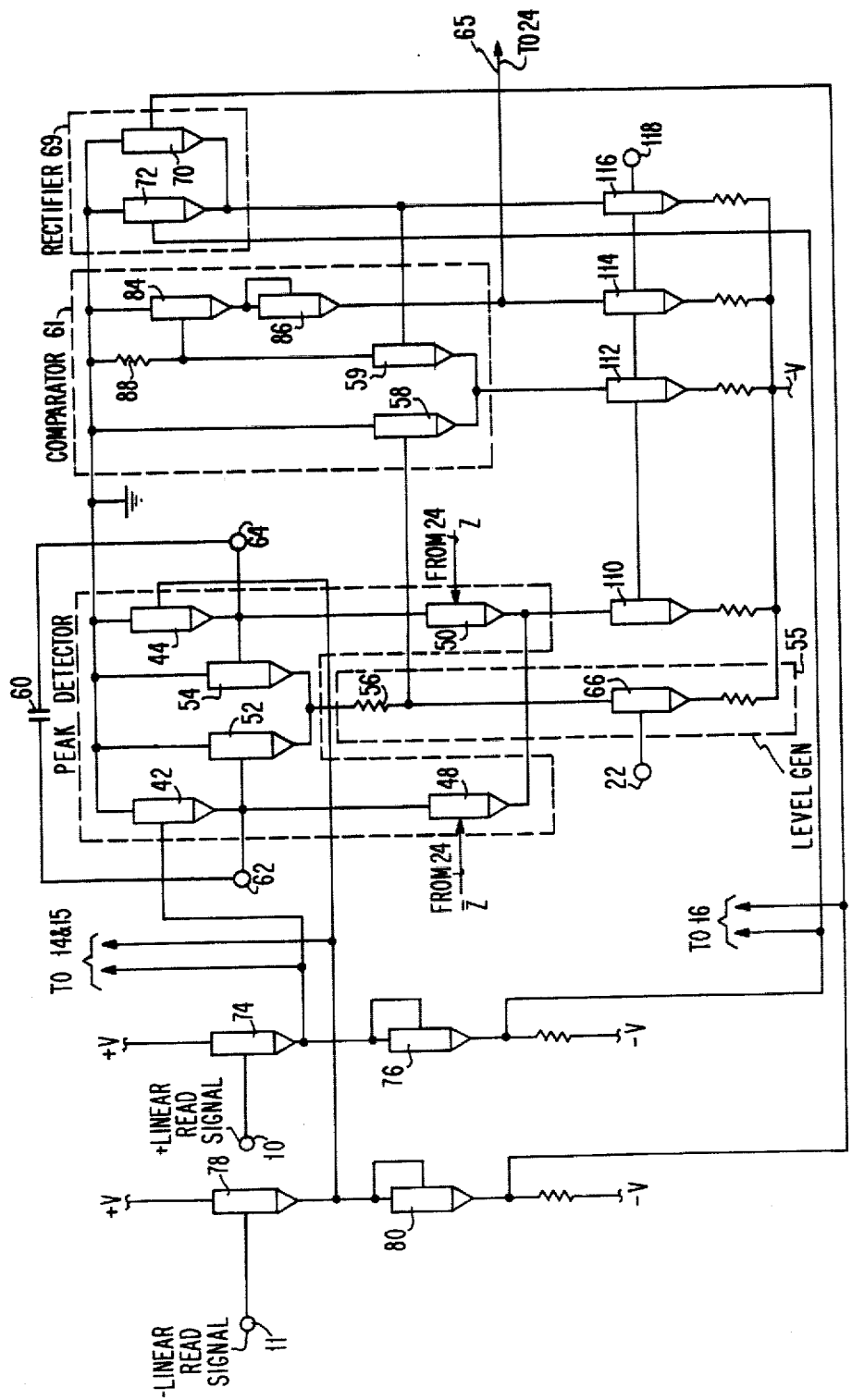
FIG. 7 is a schematic circuit diagram of the $\Delta V$ detector used with the circuit of this invention.
Figure 8:
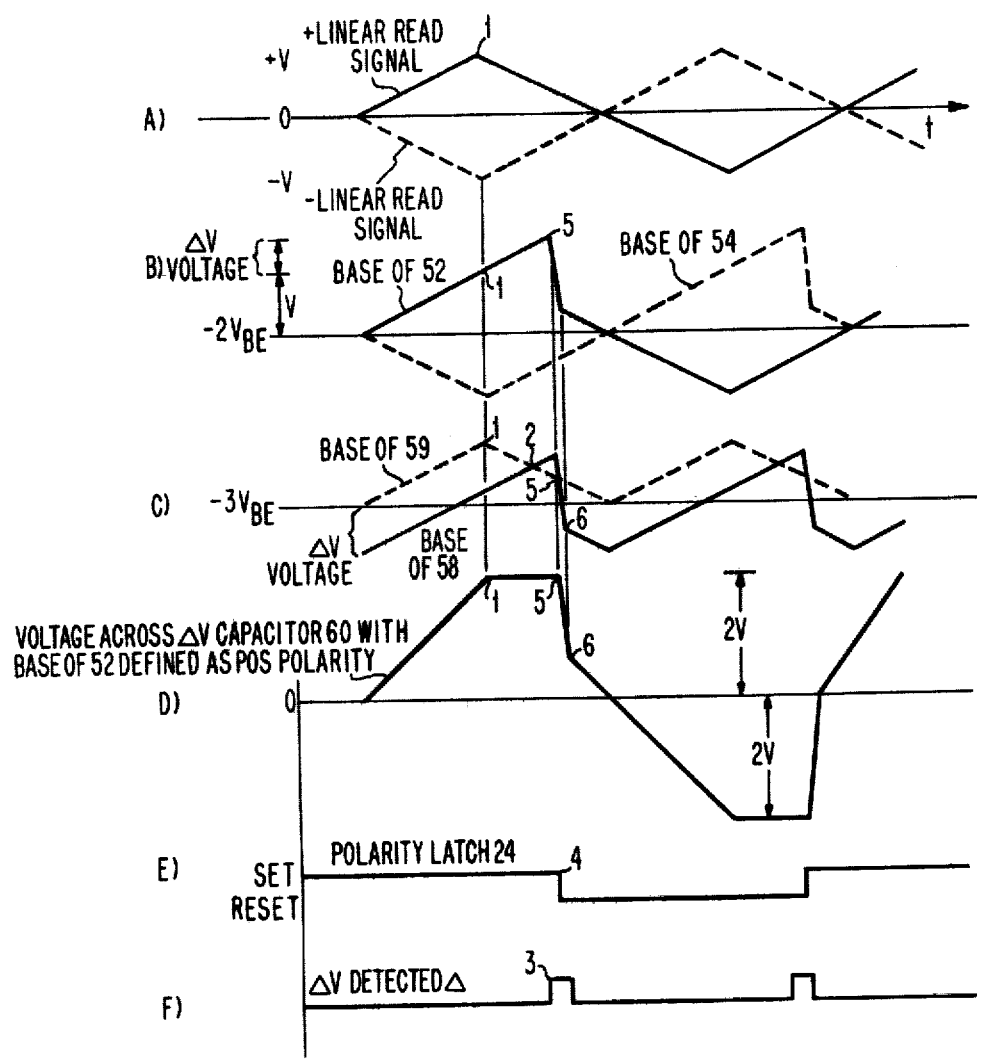
FIGS. 8A-F are voltage waveforms related to the operation of the $\Delta V$ detector.

An implementation of the ΔV detector 12 is depicted in FIG. 7, in combination with the waveforms illustrated in FIG. 8. Although triangular waveforms are shown in FIG. 8 for ease of understanding, it should be understood that the conventional read signals are sinusoidal in shape and not triangular.

The ΔV detector is composed of a peak detector 41, a ΔV detection level generator 55, a rectifier 69 and a comparator circuit 61. Th peak detector 41 includes transistors 42 and 44, and a current switch composed of transistors 48 and 50, driven by the polarity latch 24. The detected peak voltage is stored on an external capacitor 60, connected between the emitters of transistors 42 and 44. The voltage on each side of the capacitor 60 is buffered by an emitter follower consisting of transistors 52 and 54. Since the emitters of transistors 52 and 54 are tied together, only the more positive voltage is passed on through a resistor 56 to the base of transistor 58 of the comparator 61. The voltage at the base of transistor 58 is the voltage on the most positive side of the capacitor 60, minus one base-emitter voltage drop, minus the voltage drop on the resistor 56 as set by the ΔV level generator 55. The current seitch 48, 50 driven by the polarity latch 24 will supply current to either terminal 62 or terminal 64 of the peak detector 41. Depending upon the state of the polarity latch, the emitter follower transistor 42 or 44, to which the current from the current switch is being directed, will be able to follow the voltage at its base. The emitter follower that does not have a current sink via the current switch 48,50 will be able only to charge the external capacitor 60, and thus will act as a peak detector.

During peak detection, the ΔV detection level generator 55 applies a DC voltage drop across resistor 56. The voltage drop across resistor 56 is determined by the collector current from transistor 66, which is in turn determined by the voltage on terminal 22.

The rectifier 69 is composed of transistors 70 and 72 which cause the more positive input signal of either the positive linear read signal or the negative linear read signal to be applied to the comparator 61 at the base of transistor 59. The signals are processed as they are received from the input buffer stage formed by transistors 74, 76, 78 and 80. The voltage waveform at the base of transistor 59 is shown in FIG. 8C.

The comparator is formed by the emitter coupled pair of transistors 58 and 59. When the base voltage of transistor 58 rises higher than the voltage applied to the base of transistor 59, a detection will be indicated by an up level at the collector of transistor 59. This up level is translated down two diode drops by transistors 84 and 86, and transmitted to the detection logic.

Transistors 110, 112, 114 and 116 are current sources and receive a bias voltage at terminal 118.

With reference to FIGS. 7 and 8, if we assume that the polarity latch 24 is set, then the current from current switch 48, 50 is directed to terminal 64 of peak detector 41. Initially, there is zero voltage across the capacitor 60. As the positive linear read signal rises and the negative read signal input falls, the capacitor 60 will charge. The positive linear read signal is more positive, so that this read signal voltage will pass through rectifier 69 to the base of transistor 59. The voltage at terminal 62 is applied to the base of transistor 58, less the ΔV voltage.

The positive linear read signal voltage continues to rise until the peak of the input signal is reached at point 1 (FIG. 8). At this point, the capacitor 60 stops charging and holds the peak differential voltage. The voltage at the base of transistor 52 continues rising because it is being raised by the increasing voltage on the other side of the capacitor 60 connected to the emitter of transistor 44. This continues until the comparator 61 detects that the voltage at the base of transistor 58 has risen above the voltage seen at the base of transistor 59, as at point 2 (FIG. 8C). This causes a logic signal, which is designated as "ΔV detected," to be generated as at point 3 (FIG. 8F). This logic signal causes the polarity latch 24 to be reset, as at point 4.

When the polarity latch changes state, the current from the current switch, transistors 48 and 50, is directed to the terminal 62 side of the peak detector 41, which causes the capacitor 60 to begin discharging, as at point 5. The capacitor 60 will continue to discharge until it reaches the voltage level of the linear read signal, and the base-emitter junction of emitter follower transistor 42 is once again in the active region, as at point 6. A slew rate determined by the linear read signal will then be imposed on the capacitor voltage. The detection circuit will next repeat the process for detection of a negative peak. As illustrated in FIG. 8, a ΔV for a negative peak is detected in the same way as for a positive peak. In this way, the ΔV detection circuit provides an up level signal at output terminal 65 to the polarity latch 24, every time that the processed data signal has retreated from its peak amplitude by a voltage that is equivalent to the voltage drop which has been set across resistor 56.

The logic functions performed by the control logic 46, which controls the ramp control latch 32, are represented by the truth table set forth in FIGS. 9A and 9B. It should be noted that the logic condition P AND N has been excluded from the truth table, as this is an impossible condition.

The detection circuit disclosed herein employs a combination of detection criteria to obtain a more reliable detection of data. The ΔV detection level and clip level of the threshold detector are variable to allow flexibility. If the clip level is set to zero, the ΔV detection is dominant. Conversely, if the ΔV detector reference voltage is at zero, the detection circuit acts as a clip level detector. Where there is a finite reference level at both detectors, a combinatorial detector is realized.

Furthermore, in the operation of the detector of this invention, the linear read data is routed to the threshold detector, the ΔV detector and the differentiator circuits in parallel, as contrasted to serial mode operation of conventional detection circuits. Parallel operation allows a more consistent detection of borderline data peaks. The inventive detector circuit makes feasible the use of higher data recording densities and overcomes the problem of small defects and granularity of the record medium, among other things.

I claim:

1. A readout signal detection circuit comprising:
   input means for supplying a differential linear readout signal;
   means coupled to said input means for detecting peak voltages of said readout signal, and changes in amplitude relative to said peak voltages;
   threshold detecting means coupled to said input means for sensing voltages of said readout signal;

differentiator means for detecting the sign of the slopes and the occurrence of peak voltages of said readout signal, coupled to said input means;

logic circuit means coupled to said threshold detecting means and said differentiator means and said peak voltage detecting means for sampling the processed readout signal to separate valid signal peaks from spurious signals; and resettable timing means for delineating the period when valid signal pulses may be passed.

2. A readout signal detection circuit as in claim 1, including a polarity latch for storing the polarity of the last detected valid signal peak coupled to the output of said voltage change detecting means and said logic circuit means.

3. A readout signal detection circuit as in claim 2, wherein said resettable timing means comprises a ramp timer for delineating the time during which valid data pulses are passed.

4. A readout signal detecting means as in claim 3, including a ramp control latch coupled between said logic circuit means and said polarity latch for triggering said ramp timer.

5. A readout signal detection circuit as in claim 3, including an output latch responsive to said ramp timer for providing a valid output pulse at the end of the time period defined by said ramp timer.

6. A readout signal detection circuit as in claim 1, including means for setting a reference voltage coupled to said voltage change detecting means.

7. A readout signal detection circuit as in claim 1, wherein said readout signal is applied to said voltage change detecting means, said threshold detecting means and said differentiator means in parallel.

* * * * *